Patented May 15, 1951

2,552,528

UNITED STATES PATENT OFFICE 2,552,528

PROCESS FOR BREAKING PETROLEUM EMULSIONS

Melvin De Groote, St. Louis, Mo., assignor to Petrolite Corporation, Ltd., Wilmington, Del., a corporation of Delaware No Drawing. Application July 14, 1949, Serial No. 104,801

8 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is my companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See my copending application, Serial No. 104,802, filed July 14, 1949.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present invention is concerned with the breaking of petroleum emulsions by means of certain polyol ethers hereinafter described in detail. Such ethers are obtained by treating a water-soluble xylene-insoluble polyhydric reactant having at least 4 hydroxyl radicals and free from any radical having at least 8 uninterrupted carbon atoms, with propylene oxide. A plurality of moles of propylene oxide is used in molal ratio to the hydroxylated reactant so as to convert the initially water-soluble and xylene-insoluble product in an ultimate resultant which is water-insoluble and xylene-soluble. For instance, the herein described resultants, or more correctly products of reaction since they invariably and inevitably represent cogeneric mixtures rather than a single component, when mixed with distilled water so as to give a 5% solution, suspend after a fashion during vigorous agitation but on being allowed to stand in a quiescent state immediately separate out so that within a short length of time, for instance within a few minutes to several hours, all or substantially the big bulk of material has separated from the aqueous solution or suspension. In fact, in the higher stages of oxypropylation the materials obtained seem to go into water at room temperature with considerable difficulty and if the water happens to be warm, for instance, at a temperature of 50°, 60° or 70° C., the materials are even less soluble. An example of a product difficult to disperse even with vigorous shaking and which, even so, does not stay dispersed, is the resultant obtained by treating one mole of sorbitol with 200 moles of propylene oxide. Reference as to solubility is in ordinary cold water at approximately room temperature, for instance, 22.5° C., or thereabouts. Solubility in xylene refers to solubility at ordinary temperature and products herein specified are soluble in xylene so as to form a 5% solution readily. In fact, such products have been employed in demulsification using a 50% solution in xylene.

For convenience, what is said hereinafter is divided into three parts. Part 1 is concerned with the description of the polyhydric reactants employed, as well as reference to other compounds, products, etc., so there may be a clear line of demarcation between the present invention and what may appear elsewhere. Part 2 is concerned with the preparation of the oxypropylated derivatives, and Part 3 is concerned with the use of an oxypropylated derivative as a demulsifier for petroleum emulsions of the water-in-oil type.

PART 1

The water-soluble polyhydric materials having at least 4 hydroxyls employed as reactants are well known. In this introductory presentation of the invention I will refer only to a few examples such as sorbitan, mannitan, sorbitol, mannitol, pentaerythritol, dipentek, acyclic diglycerol, etc. Subsequently, other acceptable polyhydric alcohols or reactants will be described in greater detail.

The immediate objective of the text immediately following is to point out the present invention with particularity so as to differentiate what is already old in the art. It is well known that hydroxylated reactants of the kind described can be treated with an alkylene oxide, such as ethylene oxide, to yield polyol ethers. Reference is made to U. S. Patent No. 1,922,459, dated August 15, 1933, to Schmidt et al. This particular patent describes the treatment of sorbitol, pentaerythritol, pentoses, hexoses, and other sugars, and partially etherified glycerol, with alkylene oxides and specifically with propylene oxide. In said U. S. Patent No. 1,922,459 the hydroxylated reactant is treated with a comparatively small amount of the alkylene oxide, whether ethylene oxide or propylene oxide.

The objective of said patent is, in part, concerned with producing a reactant suitable as an intermediate for further reaction and there is no suggestion that the initial raw material, i. e., the polyhydric reactants, be treated with propylene oxide so as to convert water-soluble, xylene-insoluble materials into water-insoluble, xylene-soluble materials. As a matter of fact, all specific examples are addressed to the use of ethylene oxide which, as far as I know, does not give water-insolubility, xylene-solubility characteristics as hereinafter specified, and what is more important, the resultant products do not show the valuable properties enjoyed by the herein specified products.

As a more recent example of this art concerned with the oxyalkylation of polyhydric reactants, reference is made to U. S. Patent No. 2,450,079, dated September 28, 1948, to Brown. Reference is made also to this particular patent for the reason that this patent uses the word "polyol" in the same sense as herein specified except that for the purpose of the present invention I am using the word with limitations insofar that it is restricted to compounds having at least 4 carbon atoms and free from any radical having an uninterrupted group of 8 carbon atoms. I will refer hereinafter to glycerol and also to other compounds having 8 carbon atoms or more in an uninterrupted radical, but having additionally at least 4 hydroxyl radicals. Examples of the latter are products obtained by treating diols having an uninterrupted group of at least 8 carbon atoms, such as 2-methoxymethyl 2,4-dimethyl pentanediol-1,5 and 2-ethoxymethyl 2,4-dimethyl pentanediol-1,5, with 2 or more moles of glycide. For convenience, then, the definition of polyol as it appears in aforementioned U. S. Patent No. 2,450,079 is repeated herewith:

"Polyols which may be used are those of relatively low carbon content which contain at least 3 hydroxyl groups. By the term polyols, as used in this specification, are meant polyhydric alcohols and carbohydrates. Since the use of polyols of high carbon content per molecule tends to result in end products which are not sufficiently waxy and plastic, it is preferred to use polyols having not more than 12 carbon atoms per molecule. As exemplary of polyols which may be employed may be listed glycerol and the higher polyhydric alcohols, the cyclitols such as inositols, and partially alkylated cyclitols such as quebrachitol and pinitol, diglycerol and the lower polyglycerols, pentaerythritol, di-pentaerythritol and other pentaerythritol ethers, hexitans, such as sorbitan and mannitan, saccharides such as glucose, fructose, lower alkyl glucosides, sucrose, lactose, trehalose, glucosan, and mannosan, and lactones such as gluconic lactone. Polyols containing up to 6 carbon atoms in particular have yielded valuable products. Examples of such are glycerol, diglycerol, pentaerythritol, hexitans, such as sorbitan and mannitan, hexitols, such as sorbitol, mannitol, commercial sorbitol syrup, and hexoses, such as glucose. Mixture of polyols, such as partially reduced sugars, also may be employed."

Examination of the above-mentioned U. S. Patent No. 2,450,079 reveals that the effort was directed toward the preparation of a product which, when esterified with a carboxylic reactant as described, will produce a waxy product. There is no description of the introduction of a plurality of propylene oxide radicals to yield a material or mixture having the herein specified characteristics.

Reference is made also to U. S. Patent No. 2,359,750 dated October 10, 1944, to Collins, for the reason that it refers to the acyl esters, particularly the partial acyl esters of a variety of polyoxyethylene glycol ethers of hydroxylated materials of the kind herein contemplated as raw materials, and particular reference being made to those specified in column 2, lines 13 to 44, inclusive. As to the treatment of ordinary sugars, particularly raw sugar with an ethylene oxide (not proylene oxide) reference is made to PB Report No. PB-73941, Frame 9080.

Other suitable raw materials are described in U. S. Patent No. 2,164,268, dated June 27, 1939, to Covert. These particular products of interest are polyhydric alcohols having 5 hydroxyl groups on a 6-carbon chain and having the general formula $C_6H_{14}O_5$, and are generally described as hexanepentols.

As to a further description of hexitols, hexitans or the monoanhydrides thereof, and to the hexides or dianhydrides thereof which can be treated with glycide so as to yield a suitable reactant having at least 4 hydroxyls, as well as a description of other similar polyhydric material, reference is made to U. S. Patents No. 2,322,820 and 2,322,821, both dated June 29, 1943, to Brown.

Incidental reference is made also to U. S. Patent No. 2,380,166, dated July 10, 1945, to Griffin.

As previously stated, as far as I am aware there is no reference to water-soluble, xylene-insoluble polyhydric reactants of the kind specified, being treated with propylene oxide in such a manner as to yield water-insoluble, xylene-soluble resultants or reaction mixtures. At least to some extent, the peculiar properties enjoyed by these materials is presumably related in part to the enormously high molecular weight; for instance, reference has been made to treating one mole of sorbitan with 200 moles of propylene oxide and, thus, yielding a product having a molecular weight in the neighborhood of 11,000 or 12,000, based on the assumption that complete reaction takes place with complete addition so that ultimately this represents at least a statistical average as will be described in detail later. As far as I am aware, the treatment of water or propylene glycol, or for that matter, ethylene glycol or butylene glycol, with propylene oxide has not been employed to produce a resultant or ultimate mixture going into these high molecular weight ranges; even so, I have examined a number of such products, or similar products, which are usually water-soluble and I do not find them to possess the peculiar properties herein described. For instance, a polypropyleneglycol derived from propyleneglycol and propylene oxide and having a molecular weight of about 6,000 is a comparatively ineffective demulsifier compared with the products herein described. As far as I know, they have no commercial or competitive significance.

As to somewhat related products, reference is made to the following two patents: U. S. 2,448,664 dated September 7, 1948 to H. R. Fife et al., and U. S. 2,457,139, dated December 28, 1948, to H. R. Fife et al.

Reference is made also to German Patent No. 544,921 dated March 4, 1932; German Patent No.

634,952, dated September 7, 1936, and British Patent No. 465,048, October 1936.

Previous reference has been made to glycerol since this represents a trihydric reactant. It has been pointed out that derivatives derived from propylene oxide and monohydric alcohols, methyl, ethyl, propyl, butyl, etc., or from similar diols, ethyleneglycol, propyleneglycol, butyleneglycol, etc., do not give derivatives having the characteristics herein described and especially from a standpoint of demulsification of water-in-oil emulsions as found in oil fields, prepared in refineries, etc. Those obtained from triols, such as glycerol, the glycerol ether of ethyleneglycol, the glycerol ether of propyleneglycol, the glycerol ether of butyleneglycol, etc., are in an intermediate stage which, at least at the present time, justified further exploration, but at least at the moment do not justify inclusion within the present case, based particularly on use as a demulsifier.

Reference is made to the fact that etherified anhydro hexitols can be treated with glycide or similar materials to yield reactants suitable for use as raw materials in the instant invention; for instance, an etherified hexitan will serve and, for that matter, an etherified hexide, provided there is still available at least one hydroxyl for reaction with glycide or the like. See U. S. Patent 2,420,519, dated May 13, 1947, to Brown. As to the hexides, see U. S. Patent No. 2,387,842 dated October 30, 1945, to Soltzberg.

It is recognized that at least in some instances one can react sugars or similar polyhydric derivatives with propyleneglycol or polypropyleneglycol, so as to give a product which, at least in part, is comparable to starting with propylene oxide. Such procedure can be employed but appears uneconomical and inconvenient in light of the ease of adding propylene oxide directly. See U. S. Patent No. 2,407,001, dated September 3, 1946, to Griffin; also, U. S. Patent No. 2,407,003 dated September 3, 1946, to Griffin.

As to pentaerythritol and similar derivatives, particularly those having a larger number of hydroxyl groups than 6, reference is made to U. S. Patent No. 2,462,049 dated February 15, 1949, to Wyler. It is to be noted that in some instances the number of hydroxyls per reactant may be as high as 22.

As to other patents describing polyhydric materials suitable for use as reactants, reference is made to the following: U. S. Patent No. 2,223,349, dated December 3, 1940, to Bremer; U. S. Patent No. 2,288,929, dated July 7, 1942, to Wyler; U. S. Patent No. 2,294,140, dated August 25, 1942, to Taylor; U. S. Patent No. 2,322,822, dated June 29, 1943, to Brown; U. S. Patent No. 2,356,745, dated August 29, 1944, to Barth et al.; U. S. Patent No. 2,360,393, dated October 17, 1944, to Burrell; U. S. Patent No. 2,374,931, dated May 1, 1945, to Griffin; U. S. Patent No. 2,390,202, dated December 4, 1945, to Burrell et al.; U. S. Patent No. 2,401,743, dated June 11, 1946, to Bowman et al.; U. S. Patent No. 2,407,002, dated September 3, 1946, to Griffin; U. S. Patent No. 2,462,047, dated February 15, 1949, to Wyler; U. S. Patent No. 2,462,048, dated February 15, 1949, to Wyler; and U. S. Patent No. 2,462,049, dated February 15, 1949, to Wyler.

It is to be noted that the polyhydric compounds herein employed are characterized in being compounds in which there is present only carbon, hydrogen, and oxygen. This does not mean that there may not be present some other radical such as an acyl radical, provided, however, that the initial material is water-soluble. This may be illustrated by the mannitol monoacetate, sorbitol monoacetate, dulcitol monoacetate, or the corresponding hydroxyacetate, or the corresponding lactate, etc. The same would be true of an ether, as previously pointed out, such as the monomethyl ether or the monoethyl ether of the same above compounds, or similar compounds, i. e., monomethyl ether of sorbitol, monomethyl ether of mannitol, etc.

The various materials above described may, of course, be treated with some other alkylene oxide prior to oxypropylation provided that the initial raw material still meets the requirements previously set forth, particularly in regard to water solubility, xylene-insolubility, and freedom from a radical having 8 uninterrupted carbon atoms, for instance, the polyglycerols, pentaerythritols, polypentaerythritols, sorbitols, mannitols, sorbitans, mannitans, which may be treated with a mole or several moles of ethylene oxide, provided that subsequent oxypropylation produces xylene-solubility and water-insolubility, as specified.

The same is true in regard to glycide or a combination of ethylene oxide and glycide. One may, of course, treat such initial raw material with butylene oxide, which will, of course, decrease the water-solubility somewhat, provided, however, that the initial raw material prior to oxypropylation is still water-soluble and xylene-insoluble but becomes water-insoluble and xylene-soluble on oxypropylation. Numerous other variations can be mentioned, such as treatment with epichlorohydrin, with subsequent de-hydrochlorination so as to form an epoxy ring, followed, if desired, by reacting such terminal epoxy ring with an alcohol, such as methyl or ethyl alcohol.

What has been said previously suggests that there is an extensive number of polyhydric reactants which may be used to produce the herein described compounds or mixtures. I have found that a certain narrow class out of this large group is particularly valuable for various purposes, such as breaking petroleum emulsions of the water-in-oil type and also for the preparation of derivatives which show this demulsifying effect to an equal or even greater degree. Reference is made to these derivatives obtained from the hexatols or hexahydric alcohols, or sugar alcohols in which there are 6 carbon atoms in a single straight chain with a hydroxyl attached to each carbon atom. Three typical members are sorbitol, mannitol, and dulcitol. The two most readily available commercially are sorbitol and mannitol. Since sorbitol is the cheapest of the three my choice was to use it in preparing these outstanding derivatives, which really represent an invention within an invention and from that particular angle are disclosed and claimed in my co-pending applications, Serial Nos. 104,802, and 104,803, both filed July 14, 1949.

Previous reference has been made to the fact that in describing the polyol ethers herein specified, one does not get a single compound but rather a cogeneric mixture which can be characterized statistically in terms of the reactants, or ratio of reactants rather than in terms of a single chemical compound. In producing the herein described products I have employed 8 to 75 moles of propylene oxide per initial hydroxyl. Stated another way, starting with sorbitan or sorbitol or pentaerythritol I have employed approximately 30 moles of propylene oxide per hydroxyl of the polyhydric reactant and in such instances where the polyhydric reactant contained 8 to 12 hydroxyls, a much greater amount is employed. For instance, in the case of sorbitol, mannitol, and the like, I have employed up to 75 moles of propylene oxide per hydroxyl, or a total of 400 moles of propylene oxide per mole of sorbitol. For most purposes, however, my preference is to stay in a lower range, to wit, somewhere between 15 to 40 moles of propylene oxide per inital hydroxyl radical. In this connection it is to be noted that the addition of 8 to 60 moles of an alkylene oxide per reactive hydroxyl is not unusual as illustrated, for example, in U. S. Patent No. 2,454,541, dated November 23, 1948, to Bock. Previous reference has been made to the fact that the peculiar properties of these compounds must be related in some manner to the high molecular weight on the one hand, and the absence of a hydrophobe group having 8 uninterrupted carbon atoms in a single group on the other hand, to say nothing about their peculiar space configuration.

Referring now to the consideration of sorbitan or mannitan, or any other tetrahydric reactant, it is to be noted that if one does add as many as 60 moles of propylene oxide per hydroxyl then this alone produces the molecular weight of approximately 3500 per hydroxyl or a total of 14,000 in all. Going to a hexahydric reactant, the molecular weight would be 50% higher, or in the neighborhood of 20,000. I have prepared compounds which, assuming that all the propylene oxide employed became part of the initial reactant, produced a mixture where the average molecular weight would be in the neighborhood of 25,000, and with 20,000 to 30,000 molecular weight as the upper limit. Unfortunately, there is no suitable method of determining such molecular weights and this point will be referred to briefly in the text in a subsequent paragraph.

As an overall preference, my preferred class is in the molecular weight range of 4,000 to 14,000 with 10,000 being a particularly suitable figure. This applies not only to the class generically but also to the class referred to in my two copending applications, Serial Nos. 104,802, and 104,803, both filed July 14, 1949, which deal exclusively with sorbitol, mannitol, and dulcitol derivatives.

In this particular connection it is rather interesting to note the effect of space configuration in the following respect. Sorbitol, for example, has a molecular weight of 182. In a derivative derived by oxypropylation having a molecular weight of 9,000 or thereabouts, the sorbitol, contributes only 2% of the total molecule. In a compound having a molecular weight of 18,000 it contributes only 1%, and yet there is all the difference in the world between these compounds as far as superiority in demulsification is concerned and compounds derived, for example, from methyl alcohol, ethyl alcohol, propyl alcohol, ethyleneglycol, propyleneglycol, or butyleneglycol, by oxypropylation so as to be within the same molecular weight range.

In order to illustrate why the herein contemplated compounds or said products are co-generic mixtures and not single chemical compounds, and why they must be described in terms of manufacture, and molal ratio or percentage ratio of reactants, reference is made to a monohydric alcohol. The herein described initial reactant is a polyhydric alcohol having at least 4 hydroxyls. However, one need only consider what happens when a monohydric alcohol is subjected to oxyalkylation.

If one selects any hydroxylated compound and subjects such compound to oxyalkylation, such as oxyethylation or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide it is well known that one does not obtain a single constituent which, for sake of convenience, may be indicated as $RO(C_2H_4O)_{30}H$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

What has been said in regard to a monohydric compound, of course, is multiplied many, many times in the case of a tetrahydric compound and a hexahydric compound, or one having even a larger number of hydroxyls. This is particularly true when enough propylene oxide is added to give, at least on a statistical basis, assuming complete reaction, a compound having a molecular weight within the range previously specified.

Attention is directed to certain other facts in light of what has been said previously in regard to reactants. In some instances the reactants employed may have a comparatively large number of carbon atoms as exemplified by the polypentaerythritols described in aforementioned U. S. Patent No. 2,462,049 dated February 15, 1949, to Wyler. For instance, this patent mentions, among other things, the following:

| | Molecular weight |
|---|---|
| Tri-pentaerythritol | 372.41 |
| Tetra-pentaerythritol | 490.54 |
| Penta-pentaerythritol | 608.67 |
| Hexa-pentaerythritol | 726.80 |
| Hepta-pentaerythritol | 844.93 |
| Octa-pentaerythritol | 963.06 |
| Nona-pentaerythritol | 1,081.19 |
| Deca-pentaerythritol | 1,199.32 |

Similarly, a compound with a sufficient number of hydroxyl groups may be converted into an acetal or ketal in the conventional manner and such product may be used as an initial reactant, provided that it is water-soluble as such, or water-soluble after treatment with glycide. Thus, it is seen that the oxygen atom appears in the initial reactant as part of a hydroxyl radical, as part of an ether radical including inner ethers, as part of a ketal or acetal radical, or part of an acid radical.

Basically, the compounds herein described owe their peculiar properties to a number of factors previously enumerated, at least in part: (a) size of molecule; (b) shape of molecule as far as space configuration goes; (c) absence of a single hydrophobe group having as many as 8 interrupted carbon atoms in a single radical; (d) substantial insolubility in water; (e) solubility in xylene; and (f) such combination being obtained by the action of propylene oxide alone for all practical purposes.

Actually, it can be seen that certain variations could be made without detracting from the spirit of the invention as, for example, one can start with a material such as sorbitol and treat the sorbitol with approximately 50 moles of propylene oxide and then with approximately 6 moles of glycide, and then with another 50 moles of propylene oxide. Actually, if 6 moles of glycide went on at the end of an intermediate structure and oxypropylation is resumed, the only thing that would happen is that there would be 12 terminal groups instead of 6. If one started with sorbitan and followed the same procedure, there would be 8 instead of 4; if one started with a pentose, there would be 10 instead of 5; if one used more than a single mole of glycide per terminal radical, for instance, if one used 12 moles as previously suggested, then the number of terminal groups in the sorbitol derivative might be as many as 18 or even more. The number of terminal groups from sorbitan might be as many as 12, or even more, etc. Actually, the introduction or interruption of a propylene oxide chain by a glycide radical obviously does not depart from this invention and is included within the expression "oxypropylation," for reasons which require no further explanation. The same thing is true if, at some stage in oxypropylation, one injected one or 2 ethylene radicals which would not offset other factors which complete the overall structure, as molecule size, the insolubility in water, and the solubility in xylene would all remain. If one used a mole of butylene oxide for each sorbitol hydroxyl, again one would get the same effect for the reason that the overall picture has not been changed and there is no departure from the spirit of the invention. For that matter, one might use a few moles of ethylene oxide and a few moles of butylene oxide. Basically, the invention resides in what has been said previously, that size of the molecule, the absence of the hydrophobe group having 8 carbon atoms or more and propylene oxide chains, branched or straight chain for that matter, which ultimately change a water-soluble xylene-insoluble material having a comparatively low molecular weight, under 1200 in most instances (decapentaerythritol has 1,199) into a water insoluble xylene-soluble material having a molecular weight in the neighborhood of several thousand, on up to 25,000 to 30,000 as previously pointed out, with the preferred range being in the neighborhood of 4,000 or thereabouts, to about 14,000 or thereabouts.

As previously suggested, I am aware, of course, there are compounds having 8 carbon atoms or more in a single hydrophobe group which are rendered water-soluble by virtue of a multiplicity of hydroxyl groups, such as octylglycerol, which has been treated with glycide, or a simple alcohol such as methyl alcohol which has been treated with phenylethyleneoxide, followed by treatment with glycide so that in both instances a derivative is obtained which has more than 4 hydroxyl radicals and does show initial water solubility and no xylene solubility. Such products are not included in the instant invention.

Previous reference has been made to the fact that the evaluation of materials having 3 hydroxyls, such as glycerol or the mono-alkyl ethers of pentaerythritol, the ethers obtained by treating low molal monohydric alcohols with glycide (glycerol ethers), or esters obtained by treating polyerythritol or similar polyhydric reactants with 2 or more moles of acetic acid or other low molal monocarboxy acid so as to leave 3 hydroxyls available for oxypropylation, are under appraisal and are not herein included as part of the present invention.

In order to preserve a clear line of demarcation between the present invention and certain other inventions, either described in patent applications co-pending or to be co-pending very shortly, I direct attention to the following. The present invention is not intended to include those instances where resins which are initially water-insoluble have been treated with a plurality of ethylene oxide or glycide, or a combination of the two so as to yield derivatives which are clearly water-soluble and then subsequently rendered water-insoluble, in the manner of the derivatives herein described, by the use of propylene oxide alone or the substantial use of propylene oxide alone. For instance, there is described in the co-pending applications of Melvin De Groote and Bernhard Keiser, Serial Nos. 8722 and 8723, both filed February 16, 1948, now Patents Nos. 2,499,365 and 2,499,366, respectively, both dated March 7, 1950, a wide variety of water-insoluble organic-soluble resins. At least a number of such resins can be treated with ethylene oxide or ethylene oxide and glycide as described in the two above mentioned co-pending applications, or if desired one can treat such resins with even a larger amount of ethylene oxide or ethylene oxide and glycide, for instance, up to 60 to 70 moles of the alkylene oxide (ethylene oxide or glycide) as described in U. S. Patent No. 2,454,541 dated November 23, 1948, to Bock et al. Although the Bock et al. patent is concerned with the nuclear substituent having at least 4 and preferably 8 or more carbon atoms, for this particular aspect one might just as well employ paracresol, paraethylphenol, or parapropylphenol, for the reason that hydrophobicity is related to the after-treatment with propylene oxide, notwithstanding the fact that such treatment produces substantially water-insoluble products, which presumably are completely devoid of detergent properties.

Similarly, the present invention does not include water-soluble resins which are obtainable in various manners, as, for example, by treatment of polyhydroxylated reactants having 3 or more hydroxyl groups, with long chain water-soluble dicarboxy acids, such as the following:

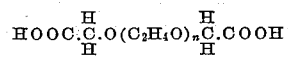

in which $n$ varies from a small number up to 15. Such acids are obtained by treatment of a polyethyleneglycol with metallic sodium, followed by treatment with chloroacetic acid, or by a procedure involving the use of acrylonitrile. This reaction for the conversion of a hydroxyl into a carboxyl is well known. Other procedures involve extensive oxyethylation prior to reaction with a dicarboxy acid, or the like. Such water-soluble resins, and they are resins in the sense that they represent polymerization reactions involving several structural units, can be rendered insoluble by the use of propylene oxide alone or the substantial use of propylene oxide in the same manner herein described. Dimers as differentiated from higher polymeric compounds, i. e., resins, can be subjected similarly to oxypropylation provided they are initially soluble. This is true, also, of dimers obtained from substituted phenols by reacton, for example, in the ratio of 2 moles of the substituted phenol to one of the aldehyde. Such dimers are water-insoluble but can be rendered water-soluble by the use of ethylene oxide or glycide, followed by after-treatment with propylene oxide. In some instances water-solubility of the resin is obtained, not only by reaction of an alkylene oxide alone, such as ethylene oxide or both, but may also be obtained additionally by the introduction of an anion-active or cation-active radical, as for example, illustrated in U. S. Patents Nos. 2,454,542, dated November 23, 1948; 2,454,543 dated November 23, 1948; 2,454,544, dated November 23, 1948; and 2,454,545 dated November 23, 1948, all to Bock et al.; or by the treatment of a material such as described in aforementioned U. S. Patent No. 2,454,541, with chloroacetic acid, followed by further reaction with a tertiary base such as pyridine or dimethyldodecylamine, or the like, so as to obtain the solubility effect of a cation.

In regard to water-soluble resins obtained from polyhydric reactants as herein specified, see U. S. Patent No. 1,999,380 dated April 30, 1935, to Weiss.

Previous reference has been made to the molecular weights being based on a statistical basis and on the assumption that complete reaction takes place between the two classes of reactants, particularly in the simplified situation in which only the polyhydric reactant and propylene oxide is used. It is well known that the usual method for determining molecular weight that is based either on an increase in boiling point or a decrease in the freezing point, is unsatisfactory for this or similar high molal materials. Other methods involving viscosities, osmotic pressure, or the like, lead to additional difference and thus, as far as I am aware, there is no really satisfactory method available. I have found that molecular weight estimates based on hydroxyl value are not necessarily satisfactory in these high molecular weight materials.

Previous reference has been made to water-soluble derivatives suitable for subsequent insolubilization by oxypropylation and obtained from substituted phenols. Needless to say, phenol (or metacresol) can be used in the same manner by conversion into resoles or novolaks. Such resoles or novolaks can be treated with ethylene oxide or glycide, or a mixture, and the resulting water-soluble derivative reacted with propylene oxide to give valuable end products, particularly for demulsification of water-in-oil emulsions.

Previous reference has been made to the fact that I do not have to use the polyhydric compounds free from other functional groups but that other functional groups may be present particularly ethers, or aldehyde groups, or ketone groups, or carboxyl groups. Examples of such derivatives are aldopentoses, aldohexoses, ketohexoses, saccharic acid, glucuronic acid, gluconic acid, etc., as well as the low molal esters, i. e., the ethyl or methyl esters of the acids. For practical purposes any such derivatives may be used, provided they are stable towards oxypropylation, or at least stable after an intermediate step, such as oxyethylation. Particularly to be preferred, however, for obvious reasons are those compounds which are stable at comparatively high temperatures, such as 150° to 170° C. This permits quick oxypropylation. By and large, all the compounds indicated can be considered as polyhydric reactants having 4 or more hydroxyl radicals or derivatives which represent a simple genetic relationship to the original hydroxylated compound and still contain at least 4 hydroxyl radicals.

Obviously there is no difficulty in selecting a suitable reactant by tests which are so simple that they hardly require explanation. Selection involves, in the main, the following determinations: (a) Molecular weight based either on known structure, known synthesis, or an actual molecular weight determination by conventional procedure. If the compound has a molecular weight of 1200 or less it is suitable; (b) the compound must be water-soluble; (c) the compound must be xylene-insoluble; (d) the compound must be at least one with 4 hydroxyl radicals; (e) the compound must be free from any radical having at least 8 uninterrupted carbon atoms; (f) the compound must be oxypropylation susceptible and this, of course, follows by the mere presence of reactive hydroxyls; (g) the compound should preferably be stable at approximately 150°–170° C.; and (h) the compound on oxypropylation with 7 to 70 moles of propylene oxide per reactive hydroxyl should become water-insoluble and xylene-soluble.

As previously stated, the methods of making such tests are obvious. Heat stability can be determined by merely heating the product alone in the presence of 1% of alkali in absence of oxygen as, for example, under a blanket of nitrogen gas, noting color changes or chemical changes; susceptibility to propylene oxide can be determined by simply using the small autoclave although, as previously pointed out, heat stability at 150°–170° C. in presence of 1% of an alkaline catalyst, provided the compound has reactive hydroxyls, invariably and inevitably characterizes it as being oxypropylation susceptible. Needless to say, oxypropylation does not have to be carried out at 150° to 170° C., if the compound is not stable and, as a matter of fact, I have conducted oxypropylation successfully at lower temperatures, for instance, at slightly above the boiling point of water, such 105°, 115° or 120° C.

In the foregoing summarizations of the invention in its various aspects and in the claims, reference to monomeric is not intended to exclude compounds, such as the polypentaerythritols, but is intended to differentiate from polyesters of the dimer or higher polymeric types obtained, for example, by reaction between sorbitol or mannitol and diglycollic acid, or the like.

Another type of material analogous to the initial polyhydric reactants herein employed are the degraded celluloses, starches and the like, which have been treated or modified in such manner as to give products of comparatively low molecular weight and are characterized by water-solubility and include such products as low viscosity methyl cellulose, hydroxyethyl cellulose, partially hydrolyzed starch, lignin or lignin derivatives, algin, pectin, partially hydrolyzed glycogen, and the like. Such materials are herein included provided, of course, that they meet all the requirements in regard to molecular weight, solubility, and number of hydroxyls, etc. Such products having a plurality of hydroxyl radicals and susceptible to oxypropylation may be treated in the same manner as herein described and yield products valuable for all the herein described purposes, and particularly for demulsification of petroleum emulsions of the water-in-oil type.

As to similar products to those already mentioned, which meet all the prescribed requirements except molecular weight, i. e., the molecular weight is significantly greater than 1200, it is desired to point out that such products can be used as initial raw materials in the same manner as those herein specified to yield valuable derivatives suitable for all the purposes set forth and particularly for resolution of petroleum emulsions of the water-in-oil type.

It is to be noted that the polyhydric reactants herein employed in combination with propylene oxide are free from elements other than carbon, hydrogen and oxygen. Similar compounds which can be used for the same purpose, and particularly for the resolution of petroleum emulsions of the water-in-oil type, are obtainable, for example, from two other classes of water-soluble and usually xylene-insoluble chemical compounds. One class consists of nitrogen-containing compounds, such as the monoamines and polyamines. Such water-soluble bases are characterized by the presence of a reactive amino hydrogen atom or a reactive alkanol radical, or both; also, by freedom from any radical having at least 8 uninterrupted carbon atoms. Oxypropylation in substantially the same manner as herein described, provided that such products are polyreactive, i. e., have a plurality of functional groups selected from the class of amino hydrogen atoms and alkanol radicals, serve as initial raw materials or reactants in the same manner described in connection with polyhydric reactants. Similarly, polycarboxy reactants having a plurality of carboxyl groups may serve as such, or after reaction, for example with ethylene oxide or glycide. Similarly, the above described water-soluble amines may be reacted with ethylene oxide or glycide, or a combination before reaction with propylene oxide.

Examples of suitable amines are mono-ethanolamine, di-ethanolamine, tri-ethanolamine, etc., and examples of suitable acids are citric acid, tricarboxylic acid, and other acids in which there is a combination of reactive functions as in tartaric acid, provided that the compounds as such, or after reaction with ethylene oxide or glycide, or both, are stable enough to permit oxypropylation. All such materials taken collectively illustrate the type reactions which are analogous to those specified here and which yield valuable products but are not claimed as part of the instant invention. All such derivatives, particularly in the molecular weight range of 5,000 to 15,000, or thereabouts, are valuable in resolving petroleum emulsions of the water-in-oil type.

At this point it may be well before going on to Part 2 to clarify some of the description of some of the initial reactants herein described. Actually, the polypentaerythritols mentioned previously are not herein included as such, notwithstanding the fact that they meet the molecular weight requirements and the multiplicity of hydroxyl radicals but because, peculiarly enough, the higher polypentaerythritols show water-insolubility which does not occur in a number of similar compounds, i. e., other compounds having the same or somewhat similar number of carbon atoms, oxygen atoms, hydroxyls, etc. The monopentaerythritol is not unduly insoluble in water and dipentaerythritol, although soluble in water, is not soluble in cold water within the previously suggested limits of several tenths of a per cent or upward.

In fact, it may be well to characterize the herein described initial reactants as having solubility in water at room temperature (22.5° C.) to the extent of at least 1%. However, the higher pentaerythritols can be mixed with a solvent, such as xylene, so they can be suspended in an autoclave of the kind described subsequently, for oxypropylation, along with a catalyst, such as sodium methylate equivalent to 1% by weight of the polypentaerythritol, and then treated with a small amount of ethylene oxide, for instance, approximately one mole per pentaerythritol unit. For this purpose the 5-carbon atom radical appearing in pentaerythritol may be considered as a unit. Thus, 2 moles of ethylene oxide makes dipentaerythritol very soluble. Similarly, 3 moles of ethylene oxide solubilizes dipentaerythritol and a higher pentaerythritol consisting of a mixture of tetra, penta, etc., is readily solubilized by a treatment with 5 moles of ethylene oxide. Xylene can be removed from the oxyethylation mixture by distilling temporarily under a vacuum or by mere straification to the extent the product is insoluble. For that matter, the xylene can be left in the mixture if it is to be employed as herein described. Glycide can be used just as effectively as ethylene oxide and less is required. If glycide is used the reaction should be handled with extreme precaution. See what is said in my two co-pending applications, Serial Nos. 104,803 and 104,804, both filed July 14, 1949.

In any event the higher pentaerythritols previously noted in the earlier part of Part 1, when treated with ethylene oxide alone in the manner indicated, yield water-soluble oxyethylated derivatives which are perfectly water-soluble—more than the 1% limit herein suggested, and meet the qualification of the upper molecular weight herein specified, to wit, 1200.

Attention is directed to this point; that the higher pentaerythritols, beginning with di-, tri-, tetra-, etc., which are not water-soluble prior to treatment with ethylene oxide or glycide, may be subjected to oxypropylation in the same manner as the other reactants herein described, usually in a suspension in xylene or the equivalent, and yield oxypropylation products in the same molecular weight range herein described and having the same ultimate characteristics, i. e., xylene solubility, water-solubility, freedom from a radical having 8 carbon atoms or more, etc., but being differentiated from the reactants employed in the instant invention in that they are not initially water-soluble, notwithstanding lack of a high molal radical (8 carbon atoms or more in an uninterrupted group) and notwithstanding the fact that the oxygen content and hydroxyl content per carbon molecule are comparatively high and in most other molecules would give water-solubility. Derivatives of such compounds are not only suitable for the resolution of petroleum emulsions of the water-in-oil type but also for forming derivatives as described subsequently, etc. See co-pending application, Serial No. 104,805, filed July 14, 1949.

Reference has been made in the description of the compounds herein described to molecular weight of 30,000 or beyond. As a mater of fact, probably from a practical standpoint a molecular weight range of approximately 15,000 or even 10,000 is of greater significance for the reason that reaction apparently slows up in these later stages due to simply the diminished probability of reaction. For instance, if one starts with sorbitol, dipentaerythritol, tetraethylene pentamine, or tripentaerythritol, there are available 6 or 7 or 8 reactive hydrogen atoms which are converted into propanol radicals in the incipient reaction period. However, if oxypropylation is continued until a molecular weight og 9,000 or 10,000 is reached such large molecule (assuming completeness of reaction, as has been stated throughout) still has only 6, 7 or 8 hydroxyl radicals, i. e., the same number as the initial reactant; of necessity, the likelihood of reaction between propylene oxide and such large molecule with the points of reaction so distributed may be much less and reaction may be much slower. I have noted such reduced speed of reaction in the upper stages although, of course the reason may rest elsewhere. Whatever the reason from a practical standpoint, i. e., based on speed of reaction, I am more inclined to place a middle value, i. e., about 15,000, as more nearly an upper limit and possibly 10,000 as a working upper limit for many reasons.

PART 2

The oxypropylation procedure employed in the preparation of derivatives from polyhydric reactants has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M to 500 R. P. M., thermometer well and thermocouple for mechanical thermometer; emptying outlet; pressure gauge; manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range, for instance, in most cases I have selected a point of approximately 160° to 165° C., as being particularly desirable and stayed within the range of 155° to 180° almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam, in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment. As an illustration of such oxypropylation procedure, the following examples are included.

Example A

The polyhydric reactant employed was anhydrous sorbitol. This was available in a number of forms. One was as an anhydrous material and the other was as a 70% sirup. If the 70% sirup was refluxed in the usual manner with benzene in a phase-separating trap at approximately 80° C., the water mixed with the sorbitol mechanically in the form of a sirup was removed and anhydrous sorbitol, after removal of benzene, was then available for reaction with propylene oxide. It is immaterial how the anhydrous sorbitol is prepared or if it is purchased in the open market.

In this example, 828 grams of anhydrous sorbitol were placed in the autoclave along with 40 grams of catalyst (powdered sodium methylate) after flushing out with nitrogen. The bomb reservoir served as a holder for propylene oxide (which has been described previously) and was charged with more than 1600 grams of propylene oxide so that 1600 grams could be withdrawn by difference and noted on the scale. It is inconvenient to attempt to withdraw all the propylene oxide from the bomb reservoir for the reason that the exit tube does not go to the very bottom of the bomb. In this particular experiment the stirring speed employed was approximately 300 R. P. M. The temperature in the autoclave was raised to 150° C. before any oxide was added. At this temperature the product was a liquid and it was stirred so as to distribute or dissolve the catalyst. Before starting the experiment a range of 150° to 180° C. was selected. Subsequent control of valves, reactor inlet, cooling water, steam, etc., are intended to keep the experiment within this range. When the temperature reached 150° C., and the catalyst was thoroughly dissolved as noted, propylene oxide was forced in using nitrogen pressure on the reservoir bomb. The fused sorbitol, perhaps due to the presence of a little benzene, showed a pressure of approximately 25 pounds gauge pressure prior to the addition of the propylene oxide. The nitrogen pressure on the propylene oxide reservoir was 100 pounds which meant that due to the conventional check gauge arrangement propylene oxide could not be forced into the autoclave for reaction if at any time the pressure in the reactor moved above 100 pounds gauge pressure. In actual operation the 1600 grams of propylene oxide were added in approximately 1½ hours and at no time did the pressure go higher than 80 pounds, and the reaction operated smoothly; at no time did it go past the preselected maximum point of 180° C. The bulk of the reaction took place at a range of 160° to 170° C. It will be noted that the amount of propylene oxide added was approximately 6 moles of propylene oxide for each mole of sorbitol, or stated another way, one mole of propylene oxide for each reactive hydroxyl. This product still showed water-solubility and was not soluble in xylene. The product was prepared essentially to be used as an intermediate product for further oxypropylations, as described in subsequent steps.

*Example B*

1100 grams of the intermediate described in Example A, preceding (representing approximately 374 grams of anhydrous sorbitol and 726 grams of propylene oxide) were reacted further with 1327 grams of propylene oxide without the further addition of any catalyst. For all practical purposes, the operating conditions as to time, temperature, etc., were the same as in Example A, preceding. This particular product represented a molal range of approximately 17 moles of propylene oxide per mole of sorbitol, or almost 3 moles of propylene oxide per reactive hydroxyl. This product was still water-soluble but it was also xylene-soluble. It is to be noted that this intermediate stage represents a class of materials which, although still water-soluble, are xylene-soluble and are valuable for many purposes, such as demulsification of water-in-oil emulsions but are not included as part of the instant invention which is limited to such stage of oxypropylation where insolubilities are obtained.

*Example C*

The initial reactant was 1149 grams of the intermediate of Example B, immediately preceding. This represented 177 grams of sorbitol and 972 grams of propylene oxide. The polyhydric reactant was combined with 1995 grams of propylene oxide. The conditions of operation were substantially the same as in Example A, preceding. The end product in this instance showed the required water-insolubility as well as the xylene-solubility. It is to be noted that this particular product represented a molal ratio of approximately 52 moles of propylene oxide per mole of sorbitol, or approximately 8 to 9 moles of propylene oxide per hydroxyl. The product in terms of percentage represented approximately 5½% sorbitol and 94½% propylene oxide. This end product was an excellent demulsifier for a number of Gulf Coast oils which are produced in fields surrounding Houston, Texas, as, for example, the field at Hastings, Texas.

*Example D*

The initial reactant was 743 grams of Example C, preceding. This represented 42 grams of sorbitol and 701 grams of propylene oxide. The total amount of propylene oxide that was added was 637 grams. The operation was conducted in exactly the same manner as in Example A, preceding, and only one difference was noted; the time of reaction was distinctly longer, requiring approximately 2½ hours instead of 1½ hours. It is to be noted, however, that no additional catalyst was added notwithstanding the fact that there had been, of course, very marked dilution due to the enormous amount of propylene oxide added. In a separate experiment this example was duplicated, adding 5 grams of sodium methylate to the same reaction mixture and the reaction proceeded in the usual length of time, to wit, 1½ hours.

The molal ratio of propylene oxide to sorbitol was 100 to 1. On a percentage basis the end product represented 3% of sorbitol and 97% of propylene oxide. When this product was employed as a demulsifying agent on the same oils referred to in Example C, preceding, it was distinctly better and in some instances 35% to 50% better, such as on one emulsion from the Hastings, Texas, field, and on another from a Fairbanks, Texas, field. Needless to say, as in Example C, preceding, the final product was water-insoluble and xylene-soluble.

*Example E*

The initial reactant employed was Example D, described immediately preceding. 566 grams of this material were mixed with an additional 5 grams of sodium methylate and then subjected to reaction with 563 grams of propylene oxide. This reaction speeded up and took place in a time even somewhat less than 1½ hours. This was the result, of course, of the added alkaline catalyst. In all other respects the procedure was the same as in Example A, preceding.

It will be noted that this final product represented approximately 200 moles of propylene oxide per mole of sorbitol, or approximately 33 moles of propylene oxide per hydroxyl. On a percentage basis the product represented 1½% sorbitol and 98½% propylene oxide.

As in Examples C and D, preceding, the product was water-insoluble and xylene-soluble. The product was effective as a demulsifier on a number of emulsions produced in the vicinity of Hastings, Texas, but not as effective as Example D, preceding.

*Example F*

The same series of five compounds described above were prepared from anhydrous mannitol. The characteristics of these five comparable derivatives are substantailly the same as those derived from sorbitol and the method of preparation is the same in all respects. Additional catalyst (5 grams of sodium methylate) was added at the fourth stage in the mannitol series without any further addition in the fifth stage.

*Example G*

In this particular example a comparatively rare sugar, dulcitol, was employed. For the purpose of economy the steps corresponding to Examples A and B were combined by reacting 187 grams of dulcitol with 1027 grams of propylene oxide, using 10 grams of sodium methylate as a catalyst. The resultant product corresponded to Example B, preceding. Thereafter, the procedure through the rest of the series was the same as in Examples C, D and E. 5 grams additional sodium methylate were added in the fourth stage, corresponding to Example D.

The characteristics of the products obtained in every respect were substantially the same as those using either sorbitol or mannitol.

All the above examples, beginning with Example B, were homogeneous and as more propylene oxide was employed they became more liquid, i. e., less viscous. Example B was rather viscous, suggesting a heavy sirup or almost a thick, slow-flowing grease. On the other hand, Example E represented a product which was readily fluid, suggesting the viscosity of castor oil or mostly in excess thereof, perhaps like slightly blown castor oil.

On oxypropylation, due to the fact that there is a modest or slight carmelization of the sorbitol or sorbitol derivative, the product tended to darken; at the same time there was a dilution factor, or effect, due to the propylene oxide which tended to lighten the color. Thus, the overall effect was that the products at all stages usually showed an amber color. This seemed to be more or less universal in the preparation of this type of derivative.

There was no difficulty encountered in handling an initial reactant, provided that it was either a liquid at ordinary temperature or was a liquid at approximately 100° to 150° C. In other words, it could be added to the autoclave cold or hot, or heated in the autoclave if introduced as a dry powder. In the case of some of the reactants, however, the materials were solids which did not necessarily melt at the selected temperature of oxypropylation and thus, are suspended in a suitable solvent, which solvent either can be left in or can be removed, as desired. In any event, the solvent can be removed from a small sample to test water-solubility or water-insolubility in absence of the solvent. The solvent, of course, should be one which is not susceptible to oxypropylation, such as xylene, cymene, tetralin, decalin, or particularly ethers, such as the diethylether of ethyleneglycol, diethylether of diethyleneglycol, or diethylether of triethyleneglycol. Similarly, the corresponding propylene ethers may be employed. It is immaterial whether reactants are soluble in these solvents or simply suspended in the solvents and become homogeneous as described in the text immediately following.

During the initial stages of reaction, for instance, comparable to Examples A and B above noted, the reaction mass may not be homogeneous. However, as one proceeds it does become homogeneous and although the word "homogeneous" is not inserted in the hereto attached claims to characterize the products, actually all such products must be homogeneous and in essence this is specified by the terminology that refers to completeness of reaction. Reference to completeness of reaction means, of course, that the product is homogeneous and it is understood that this is one of the obvious characteristics of the oxypropylation end products.

Where sodium methylate has been used as a catalyst, needless to say, any of the other conventional alkaline catalysts, such as caustic soda, caustic potash, etc., can be used.

What is said herein applies not only to the preceding examples but also to the examples in subsequent tables.

TABLE 1

| Example No. | Polyhydric Chem. Cmpd. or Prior Derivative | Molecular Wt. | No. of Hydroxyl Radicals | Amt., Grams | Amt. of Sod. Meth. Added, If Any | Amt. of Propylene Oxide Added | Molal Ratio per Initial Molecule | Molal Ratio per Initial Hydroxyl Rad. | Molec. Wt. of Derivative |
|---|---|---|---|---|---|---|---|---|---|
| 1 | Acyclic diglycerol | 166 | 4 | 166 | 8.5 | 1,160 | 20 | 5 | 1,326 |
| 2 | Pentaerythritol | 136 | 4 | 136 | 6.5 | 1,160 | 20 | 5 | 1,296 |
| 3 | Di-pentaerythritol | 254 | 6 | 254 | 12.5 | 1,160 | 20 | 3.3 | 1,414 |
| 4 | Tri-pentaeryth | 372 | 8 | 372 | 20.0 | 1,160 | 20 | 2.5 | 1,532 |
| 5 | Sorbitan | 164 | 4 | 164 | 8.5 | 1,160 | 20 | 5 | 1,324 |
| 6 | Mannitan | 164 | 4 | 164 | 8.5 | 1,160 | 20 | 5 | 1,324 |
| 7 | Monoglycerol ether of trimethylol propane | 208 | 4 | 208 | 10.0 | 1,160 | 20 | 5 | 1,368 |
| 8 | Monoglycerol ether of pentaeryth. | 210 | 5 | 210 | 10.0 | 1,160 | 20 | 4 | 1,370 |
| 9 | Monoglycerol ether of dipentaeryth. | 328 | 7 | 328 | 18.0 | 1,160 | 20 | 3 | 1,488 |
| 10 | Monoglycerol ether of tripentaeryth. | 448 | 9 | 448 | 22.5 | 1,160 | 20 | 2.2 | 1,608 |
| 11 | Monoglycerol ether of sorbitan | 238 | 5 | 238 | 12.0 | 1,160 | 20 | 4 | 1,398 |
| 12 | Monoglycerol ether of mannitan | 238 | 5 | 238 | 12.0 | 1,160 | 20 | 4 | 1,398 |
| 13 | Monoethyleneglycol ether of acyclic diglycerol | 210 | 4 | 210 | 10.0 | 1,160 | 20 | 5 | 1,370 |
| 14 | Monoethyleneglycol ether of pentaery | 180 | 4 | 180 | 9.0 | 1,160 | 20 | 5 | 1,340 |
| 15 | Monoethylene glycol ether of dipentaerythritol | 298 | 6 | 298 | 15.0 | 1,160 | 20 | 3.3 | 1,458 |
| 16 | Monoethylene glycol ether of tripentaerythritol | 416 | 8 | 416 | 20.0 | 1,160 | 20 | 2.5 | 1,576 |
| 17 | Monoethylene glycol ether of sorbitan | 208 | 4 | 208 | 10.0 | 1,160 | 20 | 5 | 1,368 |
| 18 | Monoethylene glycol ether of mannitan | 208 | 4 | 208 | 10.0 | 1,160 | 20 | 5 | 1,368 |
| 19 | Hexanepentol ($C_6H_{14}O_5$) | 166 | 5 | 166 | 8.5 | 1,160 | 20 | 4 | 1,326 |
| 20 | 2,2,6,6-tetramethylol cyclohexanol | 204 | 5 | 204 | 10.0 | 1,160 | 20 | 4 | 1,364 |

Note that the last compound above contains 10 uninterrupted carbon atoms in a single radical.

TABLE 2

| Example No. | Polyhydric Chem. Cmpd. or Prior Derivative | Molec. Wt. | No. of Hydroxyl Radicals | Amt., Grams | Amt. of Sod. Meth. Added, if any | Amt. of Propylene Oxide Added | Molec. Wt. of Derivative | Xyl. Solubility | Water Solubility |
|---|---|---|---|---|---|---|---|---|---|
| 21 | Ex. 1 | 1,326 | 4 | 442 | None | 1,160 | 4,806 | Yes | No |
| 22 | Ex. 2 | 1,296 | 4 | 443 | ---do--- | 1,160 | 4,776 | Yes | No |
| 23 | Ex. 3 | 1,414 | 6 | 471 | ---do--- | 1,160 | 4,894 | Yes | No |
| 24 | Ex. 4 | 1,532 | 8 | 511 | ---do--- | 1,160 | 5,012 | Yes | No |
| 25 | Ex. 5 | 1,324 | 4 | 441 | ---do--- | 1,160 | 4,804 | Yes | No |
| 26 | Ex. 6 | 1,324 | 4 | 441 | ---do--- | 1,160 | 4,804 | Yes | No |
| 27 | Ex. 7 | 1,368 | 4 | 456 | ---do--- | 1,160 | 4,848 | Yes | No |
| 28 | Ex. 8 | 1,370 | 5 | 457 | ---do--- | 1,160 | 4,850 | Yes | No |
| 29 | Ex. 9 | 1,488 | 7 | 496 | ---do--- | 1,160 | 4,968 | Yes | No |
| 30 | Ex. 10 | 1,608 | 9 | 536 | ---do--- | 1,160 | 5,088 | Yes | No |
| 31 | Ex. 11 | 1,398 | 5 | 466 | ---do--- | 1,160 | 4,878 | Yes | No |
| 32 | Ex. 12 | 1,398 | 5 | 466 | ---do--- | 1,160 | 4,878 | Yes | No |
| 33 | Ex. 13 | 1,370 | 4 | 457 | ---do--- | 1,160 | 4,850 | Yes | No |
| 34 | Ex. 14 | 1,340 | 4 | 413 | ---do--- | 1,160 | 4,820 | Yes | No |
| 35 | Ex. 15 | 1,458 | 6 | 486 | ---do--- | 1,160 | 4,938 | Yes | No |
| 36 | Ex. 16 | 1,576 | 8 | 525 | ---do--- | 1,160 | 5,056 | Yes | No |
| 37 | Ex. 17 | 1,368 | 4 | 456 | ---do--- | 1,160 | 4,848 | Yes | No |
| 38 | Ex. 18 | 1,368 | 4 | 456 | ---do--- | 1,160 | 4,848 | Yes | No |
| 39 | Ex. 19 | 1,326 | 5 | 445 | ---do--- | 1,160 | 4,806 | Yes | No |
| 40 | Ex. 20 | 1,364 | 5 | 455 | ---do--- | 1,160 | 4,844 | Yes | No |

TABLE 3

| Example No. | Polyhydric Chem. Cmpd. or Prior Derivative | Molec. Wt. | No. of Hydroxyl Radicals | Amt., Grams | Amt. of Sod. Meth. Added, if any | Amt. of Propylene Oxide Added | Molec. Wt. of Derivative | Xyl. Solubility | Water Solubility |
|---|---|---|---|---|---|---|---|---|---|
| 41 | Ex. 21 | 4,806 | 4 | 481 | 7 | 232 | 7,126 | Yes | No |
| 42 | Ex. 22 | 4,776 | 4 | 477 | 7 | 232 | 7,096 | Yes | No |
| 43 | Ex. 23 | 4,894 | 6 | 490 | 7 | 232 | 7,214 | Yes | No |
| 44 | Ex. 24 | 5,012 | 8 | 501 | 7 | 232 | 7,332 | Yes | No |
| 45 | Ex. 25 | 4,804 | 4 | 480 | 7 | 232 | 7,124 | Yes | No |
| 46 | Ex. 26 | 4,804 | 4 | 480 | 7 | 232 | 7,124 | Yes | No |
| 47 | Ex. 27 | 4,848 | 4 | 485 | 7 | 232 | 7,168 | Yes | No |
| 48 | Ex. 28 | 4,850 | 5 | 485 | 7 | 232 | 7,170 | Yes | No |
| 49 | Ex. 29 | 4,968 | 7 | 497 | 7 | 232 | 7,288 | Yes | No |
| 50 | Ex. 30 | 5,088 | 9 | 509 | 7 | 232 | 7,408 | Yes | No |
| 51 | Ex. 31 | 4,878 | 5 | 488 | 7 | 232 | 7,198 | Yes | No |
| 52 | Ex. 32 | 4,878 | 5 | 488 | 7 | 232 | 7,198 | Yes | No |
| 53 | Ex. 33 | 4,850 | 4 | 485 | 7 | 232 | 7,170 | Yes | No |
| 54 | Ex. 34 | 4,820 | 4 | 482 | 7 | 232 | 7,140 | Yes | No |
| 55 | Ex. 35 | 4,938 | 6 | 494 | 7 | 232 | 7,258 | Yes | No |
| 56 | Ex. 36 | 5,056 | 8 | 505 | 7 | 232 | 7,376 | Yes | No |
| 57 | Ex. 37 | 4,848 | 4 | 485 | 7 | 232 | 7,168 | Yes | No |
| 58 | Ex. 38 | 4,848 | 4 | 485 | 7 | 232 | 7,168 | Yes | No |
| 59 | Ex. 39 | 4,806 | 5 | 481 | 7 | 232 | 7,126 | Yes | No |
| 60 | Ex. 40 | 4,844 | 5 | 485 | 7 | 232 | 7,164 | Yes | No |

TABLE 4

| Example No. | Polyhydric Chem. Cmpd. or Prior Derivative | Molec. Wt. | No. of Hydroxyl Radicals | Amt., Grams | Amt. of Sod. Meth. Added, if any | Amt. of Propylene Oxide Added | Molec. Wt. of Derivative | Xyl. Solubility | Water Solubility |
|---|---|---|---|---|---|---|---|---|---|
| 61 | Ex. 41 | 7,126 | 4 | 713 | None | 232 | 9,446 | Yes | Yes |
| 62 | Ex. 42 | 7,096 | 4 | 710 | ---do--- | 232 | 9,416 | Yes | Yes |
| 63 | Ex. 43 | 7,214 | 6 | 721 | ---do--- | 232 | 9,534 | Yes | Yes |
| 64 | Ex. 44 | 7,332 | 8 | 733 | ---do--- | 232 | 9,652 | Yes | Yes |
| 65 | Ex. 45 | 7,124 | 4 | 712 | ---do--- | 232 | 9,534 | Yes | Yes |
| 66 | Ex. 46 | 7,124 | 4 | 712 | ---do--- | 232 | 9,534 | Yes | Yes |
| 67 | Ex. 47 | 7,168 | 4 | 717 | ---do--- | 232 | 9,488 | Yes | Yes |
| 68 | Ex. 48 | 7,170 | 5 | 717 | ---do--- | 232 | 9,490 | Yes | Yes |
| 69 | Ex. 49 | 7,288 | 7 | 729 | ---do--- | 232 | 9,608 | Yes | Yes |
| 70 | Ex. 50 | 7,408 | 9 | 741 | ---do--- | 232 | 9,728 | Yes | Yes |
| 71 | Ex. 51 | 7,198 | 5 | 720 | ---do--- | 232 | 9,518 | Yes | Yes |
| 72 | Ex. 52 | 7,198 | 5 | 720 | ---do--- | 232 | 9,518 | Yes | Yes |
| 73 | Ex. 53 | 7,170 | 4 | 717 | ---do--- | 232 | 9,490 | Yes | Yes |
| 74 | Ex. 54 | 7,140 | 4 | 714 | ---do--- | 232 | 9,460 | Yes | Yes |
| 75 | Ex. 55 | 7,258 | 6 | 726 | ---do--- | 232 | 9,578 | Yes | Yes |
| 76 | Ex. 56 | 7,376 | 8 | 738 | ---do--- | 232 | 9,696 | Yes | Yes |
| 77 | Ex. 57 | 7,168 | 4 | 717 | ---do--- | 232 | 9,488 | Yes | Yes |
| 78 | Ex. 58 | 7,168 | 4 | 717 | ---do--- | 232 | 9,468 | Yes | Yes |
| 79 | Ex. 59 | 7,126 | 5 | 713 | ---do--- | 232 | 9,446 | Yes | Yes |
| 80 | Ex. 60 | 7,164 | 5 | 717 | ---do--- | 232 | 9,484 | Yes | Yes |

The water solubility of the initial reactant, such as a polyglycerol, sorbitol, dipentaerythritol, or the like, is simply used in the ordinary sense to mean unlimited solubility or much less, for instance, solubility in the neighborhood of a few tenths of a per cent, to several per cent.

All the weights in Tables 1 to 4, inclusive, are in grams.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the defining of petroleum, etc., may be employed as diluents. Similarly, the material or materials employed as the demulsifying agents of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000, as in desalting practice, such an apparent insolubility in oil and water is not significant because said reagents undoubtedly have solubility within such concentrations. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there in a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example D or Example 23, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. For example, a mixture which exemplifies such combination is the following:

Oxypropylated derivative, for example, the product described as Example D, or Example 23, 30%;

A cyclohexylamine salt of a polypropylated naphthalene monosulfonic acid, 20%;

An oil-soluble petroleum sulfonic acid sodium salt, 20%;

Isobutyl alcohol, 5%;

High boiling aromatic solvent, 25%.

The above proportions are all weight per cents.

Having thus described my invention, what I claim as new and desire to secure by Letters Patent, is:

1. A process for breaking petroleum emulsions of the water-in-oil type characterized by subjecting the emulsion to the action of a demulsifier including high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at last 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxpyropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant.

2. A process for breaking petroleum emulsions of the water-in-oil type characterized by subjecting the emulsion to the action of a demulsifier including high molal oxypropylation derivatives of monomeric heat-resistant polyhydric compounds, with the proviso that: (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis; (i) the preceding provisos being based on complete reaction involving the propylene oxide and the initial polyhydric reactant, and (j) said heat-resistance meaning stability at 150° to 170° C., in presence of approximately 1% of an alkaline catalyst and in absence of an oxidized medium, such as air.

3. A process for breaking petroleum emulsions of the water-in-oil type characterized by subjecting the emulsion to the action of a demulsifier including high molal oxypropylation derivatives of monomeric heat-resistant polyhydric compounds, with the proviso that: (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product the water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis (i) the preceding provisos being based on complete reaction involving the propylene oxide and the initial polyhydric reactant; (j) said heat-resistance meaning stability at 150° to 170° C., in presence of approximately 1% of an alkaline catalyst and in absence of an oxidized medium, such as air, and (k) the oxygen present in the initial polyhydric reactant be in the form of a radical selected from the class consisting of hydroxyl radicals, external ether radicals, inner ether radicals, ester radicals containing a low molal monoacyl radical, ester radicals containing a low molal alkyl radical, ketone radicals, aldehyde radicals, carboxy radicals, ketal radicals and acetal radicals.

4. The process of claim 3 wherein the molecular weight range is within the range of 4000 to 14,000.

5. The process of claim 3 wherein the molecular weight range is within the range of 4000 to 14,000 and the initial polyhydric reactant represents not more than 10% by weight of the oxypropylation end product on a statistical basis.

6. The process of claim 3 wherein the molecular weight range is within the range of 4000 to 14,000, the initial polyhydric reactant represents not more than 10% by weight of the oxypropylation end product on a statistical basis, and all the oxygen atoms present in the initial polyhydric reactant are in the form of a hydroxyl radical only.

7. The process of claim 3 wherein the molecular weight range is within the range of 4000 to 14,000, the initial polyhydric reactant represents not more than 10% by weight of the oxypropylation end product on a statistical basis, and the oxygen atoms present are in the form of both hydroxyl radicals and external ether radicals.

8. The process of claim 3 wherein the molecular weight range is within the range of 4000 to 14,000, the initial polyhydric reactant represents not more than 10% by weight of the oxypropylation end product on a statistical basis, and the oxygen atoms present are in the form of both hydroxyl radicals and internal ether radicals.

MELVIN DE GROOTE.

(References on following page)

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,278,838 | De Groote et al. | Apr. 7, 1942 |
| 2,281,419 | De Groote et al. | Apr. 28, 1942 |
| 2,307,058 | Moeller | Jan. 5, 1943 |
| 2,430,002 | De Groote et al. | Nov. 4, 1947 |
| 2,454,541 | Bock et al. | Nov. 23, 1948 |